United States Patent
Conway et al.

(10) Patent No.: US 9,301,253 B2
(45) Date of Patent: *Mar. 29, 2016

(54) SYSTEM AND METHOD FOR AUTOMATICALLY SCHEDULING RADIOS ON A MOBILE DEVICE

(75) Inventors: Dennis Conway, Kitchener (CA); Jeremy Thompson, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 944 days.

This patent is subject to a terminal disclaimer.

(21) Appl. No.: 13/465,582

(22) Filed: May 7, 2012

(65) Prior Publication Data

US 2012/0220337 A1 Aug. 30, 2012

Related U.S. Application Data

(63) Continuation of application No. 12/417,834, filed on Apr. 3, 2009, now Pat. No. 8,190,200.

(51) Int. Cl.
H04B 7/00 (2006.01)
H04W 52/02 (2009.01)

(52) U.S. Cl.
CPC .............................. *H04W 52/0216* (2013.01)

(58) Field of Classification Search
CPC ..... H04W 64/00; H04W 84/12; H04W 74/04; H04W 52/0248; H04W 52/0261; H04W 24/02; H04W 52/322
USPC .............. 455/12.1, 13.2, 277.1, 456.1, 404.1, 455/574, 438, 435.2, 455, 418
See application file for complete search history.

(56) References Cited

U.S. PATENT DOCUMENTS

| | | | |
|---|---|---|---|
| 6,377,858 B1 | 4/2002 | Koeppe | |
| 6,516,192 B1* | 2/2003 | Spaur | H04W 72/042 455/450 |
| 6,763,238 B1 | 7/2004 | Okano | |

(Continued)

FOREIGN PATENT DOCUMENTS

| | | |
|---|---|---|
| EP | 1753254 A1 | 2/2007 |
| EP | 1843613 A1 | 10/2007 |
| WO | WO 2009/027816 A2 | 3/2009 |

OTHER PUBLICATIONS

"Cell Phone External Timer"; www.physicsforums.com/showthread. php?t=218181; Available on the internet at least as early as Sep. 10, 2008; retrieved from internet Mar. 13, 2009.

(Continued)

*Primary Examiner* — Linh Nguyen
(74) *Attorney, Agent, or Firm* — Thomas Grzesik; Fleit Gibbons Gutman Bongini & Bianco P.L.

(57) ABSTRACT

Systems and methods are disclosed for automatically powering on and off one or more radios in a mobile device according to a schedule generated automatically for each of the one or more radios. To generate the schedules, each of the one or more radios are powered on for a designated period of time. During the designated period of time, information is recorded specifying the availability of network coverage for each of the radios. A schedule for each of the radios is then generated according to this information. Each radio is subsequently automatically powered on and off according its schedule.

39 Claims, 12 Drawing Sheets

(56) References Cited

U.S. PATENT DOCUMENTS

| | | | | |
|---|---|---|---|---|
| 7,139,570 | B2* | 11/2006 | Elkarat | H04W 8/06 455/432.1 |
| 7,209,740 | B2 | 4/2007 | Bahl et al. | |
| 7,245,936 | B2 | 7/2007 | Bahl et al. | |
| 7,260,390 | B1 | 8/2007 | Skinner et al. | |
| 7,737,896 | B1* | 6/2010 | Suri | H04W 48/16 343/702 |
| 7,809,384 | B2* | 10/2010 | Vargas | H04L 29/06 370/324 |
| 7,925,297 | B2 | 4/2011 | Zhu et al. | |
| 7,929,432 | B2 | 4/2011 | Zhu et al. | |
| 8,190,200 | B2* | 5/2012 | Conway et al. | 455/553.1 |
| 8,504,120 | B2* | 8/2013 | Zhang | H04W 52/0258 455/418 |
| 2002/0187780 | A1 | 12/2002 | Souissi | |
| 2003/0112178 | A1* | 6/2003 | Bajikar | H04W 48/18 342/357.31 |
| 2004/0076177 | A1 | 4/2004 | Koch et al. | |
| 2004/0133889 | A1* | 7/2004 | Colle | G06Q 10/109 718/100 |
| 2005/0105492 | A1* | 5/2005 | Simonsson | H04L 1/0001 370/332 |
| 2005/0130653 | A1 | 6/2005 | Bisdikian et al. | |
| 2005/0282494 | A1 | 12/2005 | Kossi et al. | |
| 2006/0245431 | A1* | 11/2006 | Morris | H04L 12/2854 370/395.4 |
| 2007/0263574 | A1 | 11/2007 | Lu et al. | |
| 2008/0147205 | A1* | 6/2008 | Ollis | G05B 15/02 700/11 |
| 2008/0167090 | A1 | 7/2008 | Athalye | |
| 2008/0279155 | A1 | 11/2008 | Pratt, Jr. et al. | |
| 2008/0305786 | A1 | 12/2008 | Arumi et al. | |
| 2009/0168650 | A1 | 7/2009 | Kesselman | |
| 2009/0201862 | A1 | 8/2009 | Okker et al. | |
| 2009/0291701 | A1 | 11/2009 | Zetterman et al. | |
| 2009/0318087 | A1 | 12/2009 | Mattila et al. | |
| 2010/0009725 | A1 | 1/2010 | Banerjea | |
| 2010/0061326 | A1* | 3/2010 | Lee | H04W 72/12 370/329 |
| 2010/0304770 | A1 | 12/2010 | Wietfeldt et al. | |

OTHER PUBLICATIONS

"RadioOff description"; http://handheld.softpedia.com/get/Tweaks/RadioOff-36226.shtml; Available on the internet at least as early as Sep. 10, 2008; retrieved from internet Mar. 16, 2009.

"Radio Schedule (Freeware) 1.0"; http://handheld.softpedia.com/get/System-Utilities/Enhancements/Radio/Schedule-Freeware-34108/shtml; Available on the internet at least as early as Sep. 10, 2008; retrieved from internet Mar. 16, 2009.

"Power Hero"; http://software.treonauts.com/product.asp?id=14035; Retrieved from the internet Dec. 17, 2008.

"Power Hero Review"; http://blog/treonauts.com2007/09/power-hero-revi.html; Retrieved from the internet Dec. 17, 2008.

O'Grady, J.O. et al.; "Needed: iPhone radio toggle application"; Jul. 22, 2008; http://blogs.zdnet.com/Apple/?p=2031.

"Auto Profiles 2.0 for Series 60v3: Profile Scheduler including a Bluetooth Scheduler"; http://www.symbianguru.com/auto-profiles-2-0-for-series-60-v3-profile-scheduler-including-a-bluetooth-scheduler.html; Retrieved from the internet Dec. 17, 2008.

Chimet, Dan; European Search Report from corresponding European Application No. 09157307.1; search completed Sep. 10, 2009.

Chimet, Dan; Search Report from corresponding European Application No. 12194997.8; search completed Feb. 18, 2013.

European Examination Report Dated Jul. 1, 2015, received for European Application No. 12194997.8.

* cited by examiner

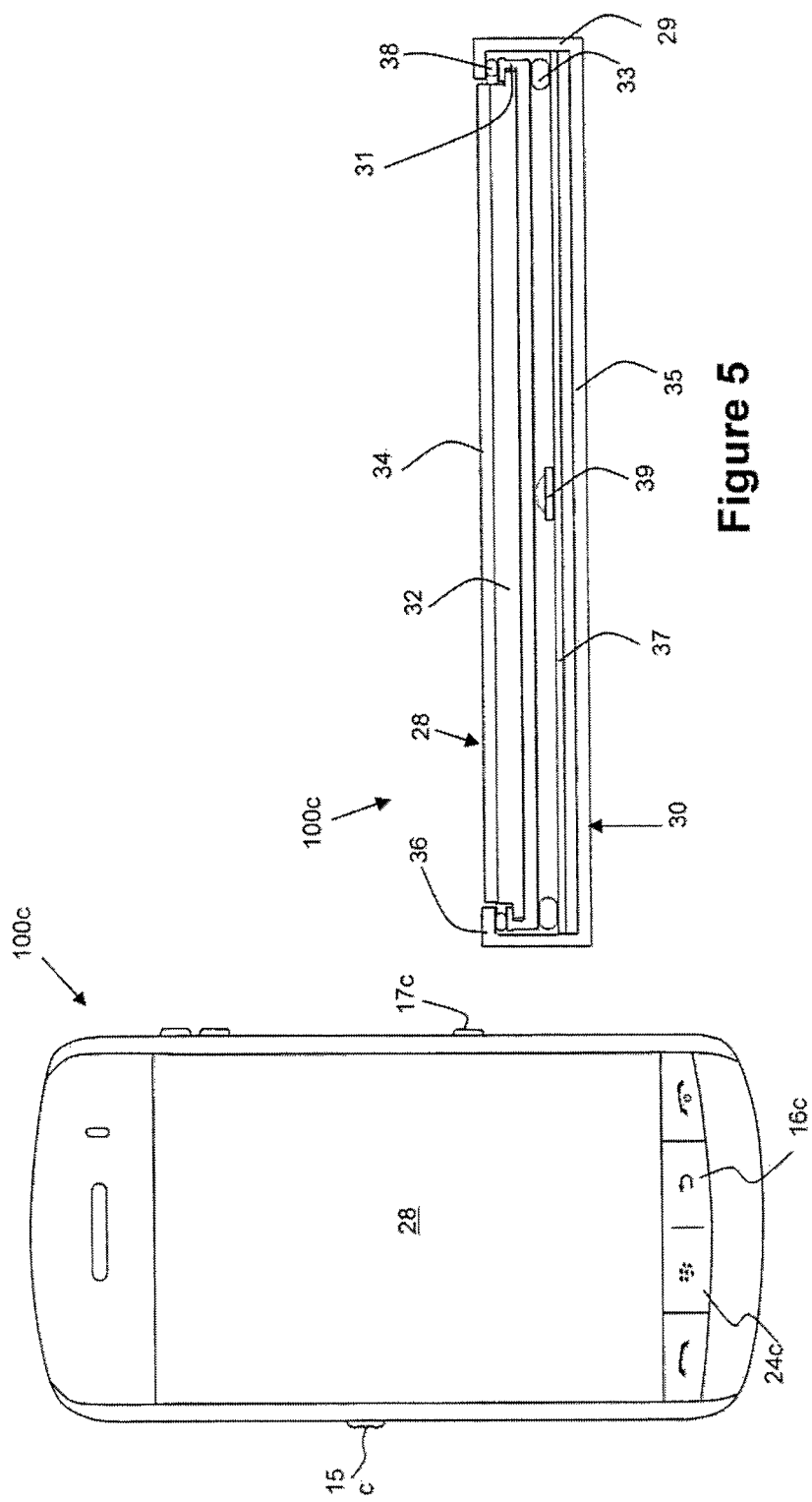

SYSTEM AND METHOD FOR AUTOMATICALLY SCHEDULING RADIOS ON A MOBILE DEVICE

CROSS-REFERENCE TO RELATED APPLICATIONS

The present application is a continuation of U.S. patent application Ser. No. 12/417,834 filed Apr. 3, 2009 incorporated herein by reference.

TECHNICAL FIELD

The following relates generally to the scheduling of radios on a mobile device.

BACKGROUND

Mobile devices are often designed to work with multiple wireless networks. For example, a mobile device may be able to operate in a number of 2G and 3G cellular networks, such as GSM and GPRS, EDGE, CDMA, UMTS, and HSDPA, as well as with networks that use IEEE 802 wireless standards such as WiFi, WiMax, and Bluetooth. Additionally, the mobile device may allow seamless roaming between a local area network, such as WiFi, and a cellular network, such as GSM.

The number of wireless networks that a mobile device is able to operate within depends in part on the user's service provider. For example, one service provider may configure the mobile device to use the GSM wireless network standard for transmitting voice data to and from a cell site and the EDGE wireless network standard for transmitting data to and from a cell site. However, another service provider may instead use the CDMA wireless network standard for transmitting voice data to and from a cell site. Additionally, when Wi-Fi coverage is available, the mobile device may be configured to use a WiFi network to transmit data to and from a wireless router.

The mobile device typically has a separate radio for each wireless network it is able to operate within. Each of these radios is typically always powered on during operation of the mobile device since the mobile device could be within the coverage range of any one of the networks and therefore wish to communicate on any one of these networks. However, the power drain from powering multiple radios simultaneously can be considerable, and can be a concern, especially if battery power is at a premium.

BRIEF DESCRIPTION OF THE DRAWINGS

Embodiments of the invention will now be described by way of example only with reference to the accompanying drawings, in which:

FIG. 4 is a plan view of another mobile device and a display screen therefor;.

FIG. 5 is a horizontal cross-sectional view of the mobile device shown in FIG. 4;

DETAILED DESCRIPTION OF THE INVENTION

Figure 1:
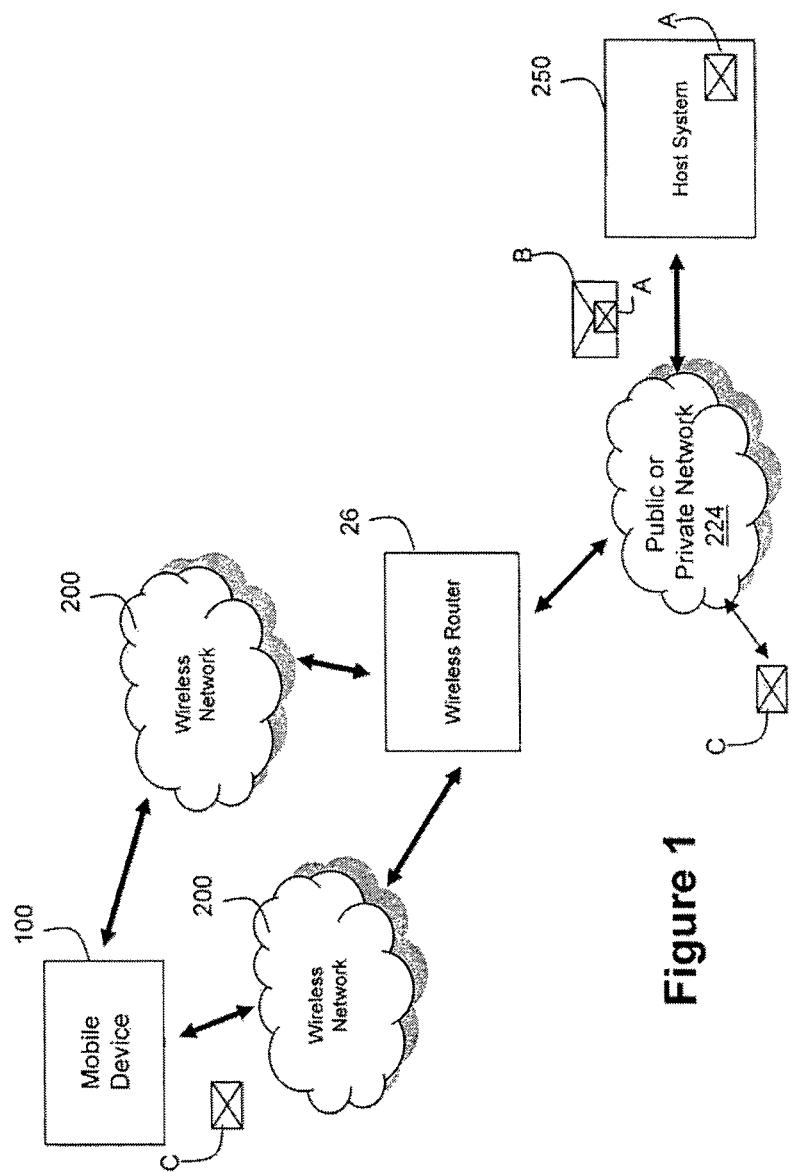
FIG. 1 is a system diagram illustrating the environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In general, it has been recognized that a mobile device can be configured to monitor when wireless network coverage is available for one or more radios and then develop a schedule to automatically power off each of the one or more radios during time periods when, according to the schedule, the wireless network coverage will not be available. This allows the mobile device to reduce power consumption since not all radios are always powered on, but are instead powered on and off according to a schedule.

Specifically, the mobile device can be configured to operate in a "learn mode" and a "normal mode". During learn mode, the one or more radios are kept powered on for a designated period of time, and during this time the mobile device monitors the availability of wireless network coverage for each of the one or more radios. A schedule for each of the one or more radios is then generated specifying when wireless network coverage is and is not available for each radio according to what was learned during learn mode. Subsequently, when the mobile device is operating in normal mode, it automatically powers on and off each of the one or more radios according to its particular schedule.

For clarity in the discussion below, communication devices will be commonly referred to as "mobile devices". Examples of applicable mobile devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 1 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer within the host system 250, to any number of server computers in the corporate network (e.g. LAN), which may, in general, include a database server, a calendar server, an E-mail server or a voice-mail server.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 6) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless paging computer as exemplified in the figures, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. Examples of wireless networks protocols for communicating between mobile device 100 and wireless router 26 include: (1) Code Division Multiple Access (CDMA), (2) the Groupe Special Mobile or the Global System for Mobile Communications (GSM) and the General Packet Radio Service (GPRS), and (3) the upcoming third-generation (3G) and fourth generation (4G) network protocols like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 3:
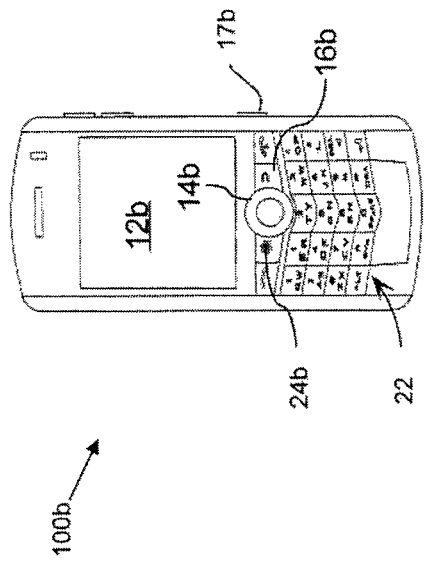
FIG. 3 is a plan view of another mobile device and a display screen therefor.
Figure 2:
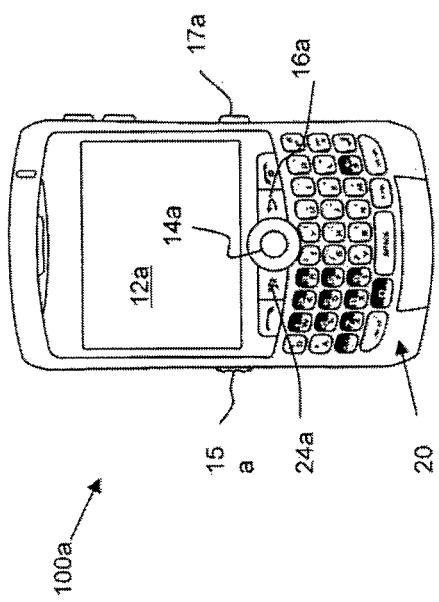
FIG. 2 is a plan view of a mobile device and a display screen therefor.

Referring now to FIGS. 2 through 5, one embodiment of a mobile device 100a is shown in FIG. 2, another embodiment of a mobile device 100b is shown in FIG. 3, and another embodiment of a mobile device 100c is shown in FIGS. 4 and 5. It will be appreciated that the numeral "100" will hereinafter refer to any mobile device 100, including the embodiments 100a, 100b and 100c, those embodiments enumerated above, or otherwise. It will also be appreciated that a similar numbering convention may be used for other general features common between FIGS. 2 through 4 such as a display 12, a positioning device 14, a cancel or escape button 16, a camera button 17, and a menu or option button 24.

The mobile device 100a shown in FIG. 2 comprises a display 12a and the cursor or view positioning device 14 shown in this embodiment is a trackball 14a. Positioning device 14 may serve as another input member and is both rotational to provide selection inputs to the main processor 102 (see FIG. 6) and can also be pressed in a direction generally toward housing to provide another selection input to the processor 102. Trackball 14a permits multi-directional positioning of the selection cursor 18 (see FIG. 8) such that the selection cursor 18 can be moved in an upward direction, in a downward direction and, if desired and/or permitted, in any diagonal direction. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 (see FIG. 8) that depicts generally where the next input or selection will be received. The selection cursor 18 may comprise a box, alteration of an icon or any combination of features that enable the user to identify the currently chosen icon or item. The mobile device 100a in FIG. 2 also comprises a programmable convenience button 15a to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15a and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 3 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 3, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

Referring to FIGS. 4 and 5, the mobile device 100c is shown comprising a touch-sensitive display. In FIG. 4, the touch sensitive display 28 allows a user to interact with the mobile device 100c. In this embodiment, the mobile device 100c also comprises a menu or option button 24c and a cancel or escape button 16c. In this example, a convenience button 15c and camera button 17c are disposed on the sides of the housing.

As best shown in FIG. 5, the housing 30 of the mobile device 100c includes a back 35, a frame 36, which frames the touch-sensitive display 28, sidewalls 29 that extend between and generally perpendicular to the back 35 and the frame 36, and a base 37 that is spaced from and generally parallel to the back 35. The base 37 can be any suitable base and can include, for example, a printed circuit board or flex circuit board. The back 35 includes a plate (not shown) that is releasably attached for insertion and removal of, for example, a battery and a SIM/RUIM card. It will be appreciated that the back 35, the sidewalls 29 and the frame 36 can be injection molded, for example. In the exemplary mobile device 100c shown in FIG. 4, the frame 36 is generally rectangular with rounded corners although other shapes are possible.

The display device 32 and the overlay 34 can be supported on a support tray 31 of suitable material such as magnesium for providing mechanical support to the display device 32 and overlay 34. The display device 32 and overlay 34 are biased away from the base 37, toward the frame 36 by biasing elements 33 such as gel pads between the support tray 31 and the base 37. Compliant spacers 38, which can also be in the form of gel pads for example, are located between an upper portion of the support tray 31 and the frame 36. The touch screen display 28 is moveable within the housing 30 as the touch screen display 28 can be moved toward the base 37, thereby compressing the biasing elements 33. The touch screen display 28 can also be pivoted within the housing 30 with one side of the touch screen display 28 moving toward the base 37, thereby compressing the biasing elements 33 on the same side of the touch screen display 28 that moves toward the base 37.

In the present example, the switch 39 is supported on one side of the base 37 which can be printed circuit board while the opposing side provides mechanical support and electrical connection for other components (not shown) of the mobile device 100c. The switch 39 can be located between the base 37 and the support tray 31. The switch 39, which can be a mechanical dome-type switch, for example, can be located in any suitable position such that displacement of the touch screen display 28 resulting from a user pressing the touch screen display 28 with sufficient force to overcome the bias and to overcome the actuation force for the switch 39, depresses and actuates the switch 39. In the present embodiment the switch 39 is in contact with the support tray 31. Thus, depression of the touch screen display 28 by user application of a force thereto, causes actuation of the switch 39, thereby providing the user with a positive tactile quality during user interaction with the user interface of the portable electronic device 20. The switch 39 is not actuated in the rest position shown in FIG. 5, absent applied force by the user. It will be appreciated that the switch 39 can be actuated by pressing anywhere on the touch screen display 28 to cause movement of the touch screen display 28 in the form of movement parallel with the base 37 or pivoting of one side of the touch screen display 28 toward the base 37. The switch 39 is connected to a processor and can be used for further input to the processor when actuated. Although a single switch is shown any suitable number of switches can be used and can be located in any suitable position.

The touch screen display 28 can be any suitable touch screen display such as a capacitive touch screen display. A capacitive touch screen display 28 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 28 can be determined. For example, the size and the shape of the touch on the touch screen display 28 can be determined in addition to the location (X and Y values) based on the signals received at the controller 36 from the touch sensor layers.

As will be appreciated, a controller interprets touch events detected on the touch screen display 28, and controls the portable electronic device 20 accordingly. As used herein, a touch event can be, for example, a single touch, a combination of touches, such as a "double touch", a "touch and hold", a "touch and drag", or a touch made with sufficient force to depress the switch 39 described above. The interpretation of a given touch event will depend on the software and implementation details used by the portable electronic device 20. According to an embodiment, an activation touch event, also referred to as a "click" touch event or "clicking", is a touch event where sufficient force is applied to the touch screen 38 to depress or activate the switch 39, and to provide tactile feedback to the user. Such an activation touch event invokes an action as determined by the underlying application and as displayed to the user in a graphical user interface (GUI). As used herein, a user selection is made by such an activation touch event. According to an embodiment, a highlighting touch event, also referred to as a "focus" touch event, is a touch event where the touch screen display 28 is touched lightly without sufficient force to activate the switch 38, and causes the item so touched to be highlighted, or otherwise visibly selected, for further action.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 1 through 5 are for illustrative purposes only and various other mobile devices 100 are equally applicable to the following examples. For example, other mobile devices 100 may include the trackball 14b, escape button 16b and menu or option button 24 similar to that shown in FIG. 3 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 2 through 5, other configurations such as clamshell or "flip-phone" configurations are also applicable.

To aid the reader in understanding the structure of the mobile device 100 and how it communicates with each wireless network 200, reference will now be made to FIGS. 6 through 9.

Figure 6:
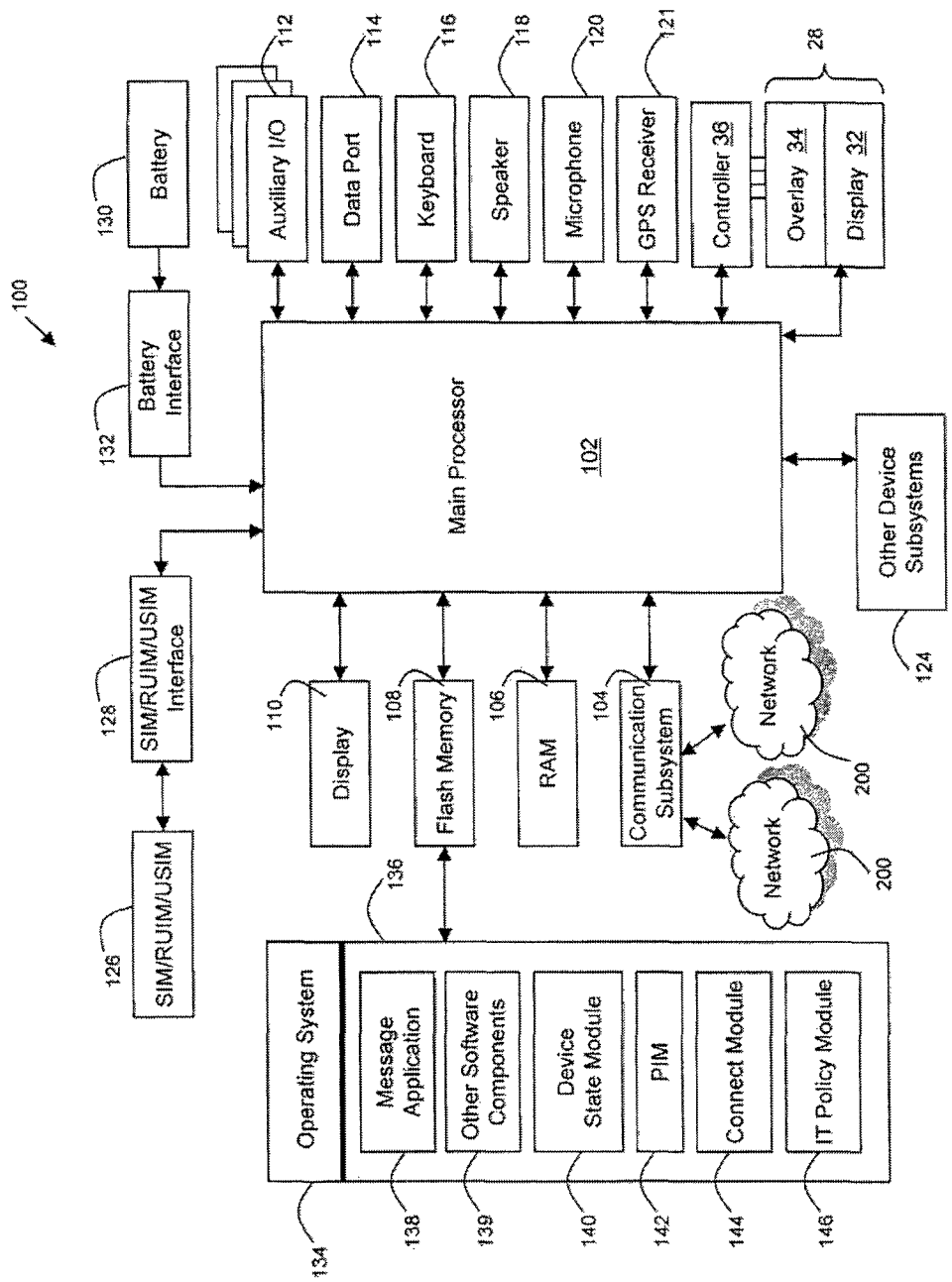
FIG. 6 is a block diagram of an exemplary embodiment of a mobile device.

Referring first to FIG. 6, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to each wireless network 200. Each wireless link connecting the communication subsystem 104 with each wireless network 200 represents one or more different Radio Frequency (RF) channels, operating according to defined protocols specified for the particular network.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over a network 200, and device-resident functions such as a calculator or task list.

The mobile device 100 can send and receive communication signals over a wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the associated wireless network 200. Once the SIM/RUIM/USIM 126 is inserted into the SIM/RUIM/USIM interface 128, it is coupled to the main processor 102.

The mobile device 100 is a battery-powered device and therefore includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications or third party applications, which are added after the manufacture of the mobile device 100. Examples of third party applications include games, calculators, utilities, etc.

The additional applications 139 can be loaded onto the mobile device 100 through at least one of a wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use the touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over a wireless network 200 through the communication subsystem 104.

Figure 7:
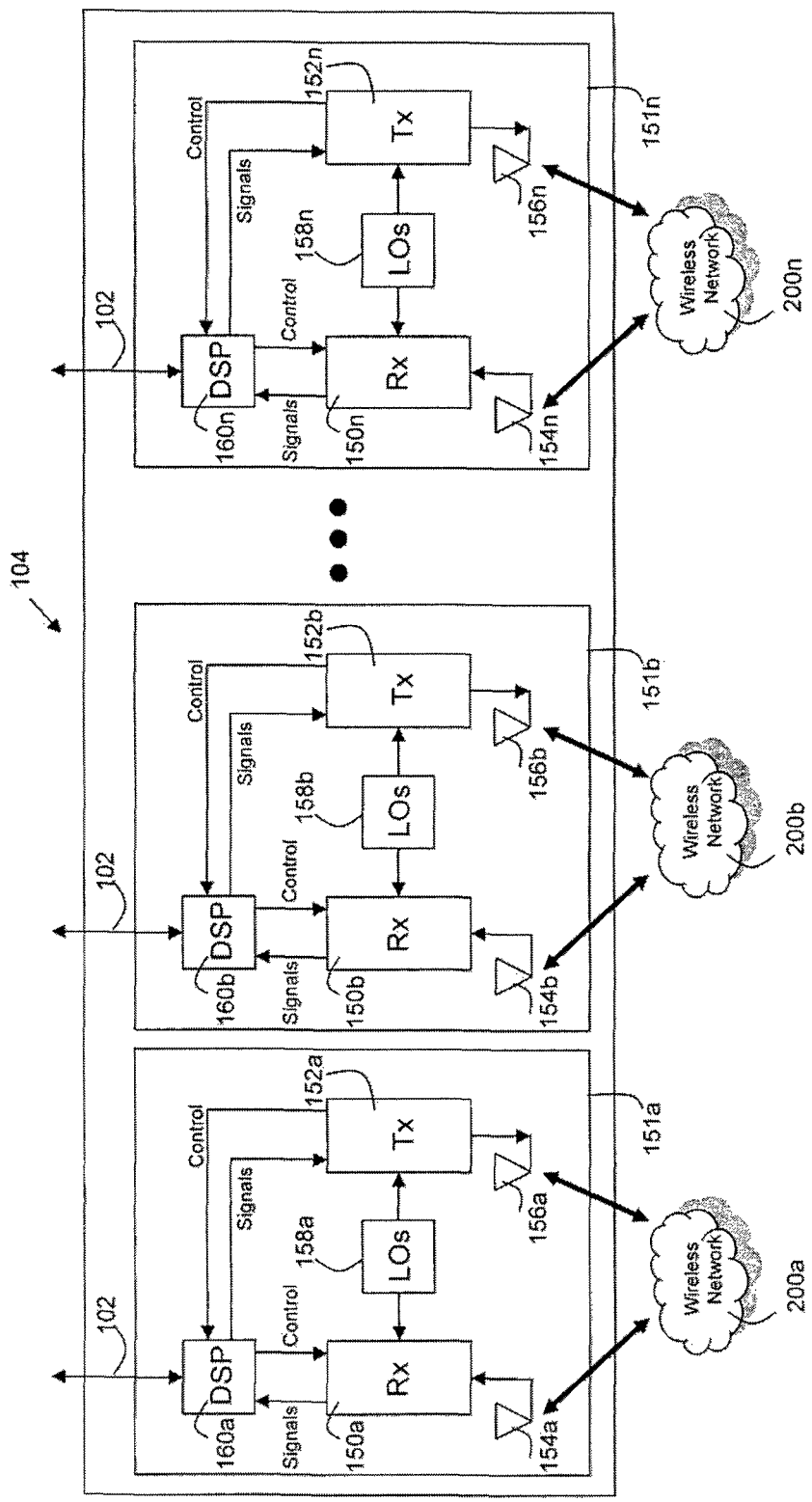
FIG. 7 is a block diagram of an exemplary embodiment of a communication subsystem component of a mobile device.

Referring now to FIG. 7, an exemplary block diagram of the communication subsystem component 104 is shown. The communication subsystem 104 comprises a number of radios 151a to 151n, each one configured for communicating with a corresponding wireless network 200a to 200n over a particular protocol. It will be appreciated that the numeral "151" will hereinafter refer to any radio, including the embodiments 151a to 151n, and that the numeral "200" will hereinafter refer to any wireless network, including the embodiments 200a to 200n. It will also be appreciated that 'n' represents an arbitrary number corresponding to the total number of radios 151 or wireless networks 200 in the particular application.

Examples of wireless networks include GSM, CDMA, EDGE, UMTS, HSDPA, LTE, WiFi, WiMax, Bluetooth, or one of the other 2G, 3G, or emerging 4G networks. For a given wireless network 200, the corresponding radio 151 has the necessary hardware and software to operate according to the defined protocols specified for that wireless network 200. Therefore, it will be appreciated that the particular design of each radio 151 is dependent upon the corresponding wireless communication network 200 with which the mobile device 100 is intended to operate. In general, though, each radio 151 typically includes a receiver 150, a transmitter 152, associated components such as one or more embedded or internal antenna elements 154 and 156, Local Oscillators (LOs) 158, and a processing module such as a Digital Signal Processor (DSP) 160. However, it should be understood that the design of the radios illustrated in FIG. 7 serves only as an example.

Signals received by an antenna 154 through a wireless network 200 are fed to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and a wireless network 200 can contain one or more different channels, typically different RF channels, and associated protocols are used between the mobile device 100 and the particular wireless network 200. An RF channel is a limited resource that must be conserved, typically due to limits in overall bandwidth and limited battery power of the mobile device 100.

Figure 8:
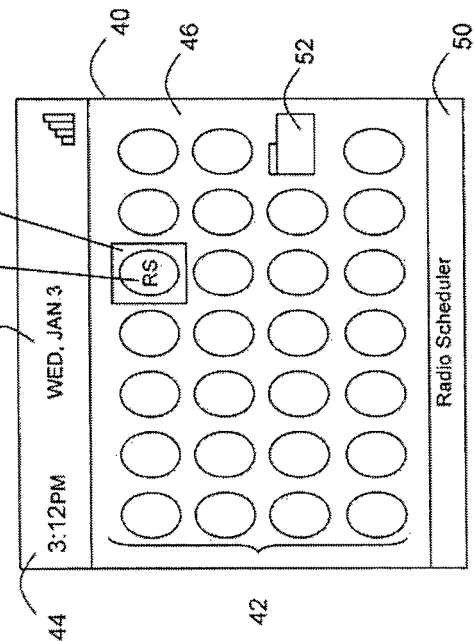
FIG. 8 is a screen shot of a home screen displayed by a mobile device.

Turning now to FIG. 8, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 8 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application may be initiated (opened or viewed) from display 12 by highlighting a corresponding icon 53 using the positioning device 14 and providing a suitable user input to the mobile device 100. For example, an application may be initiated by moving the positioning device 14 such that the corresponding icon 53 is highlighted by the selection box 18 as shown in FIG. 8, and providing a selection input, e.g. by pressing the trackball 14b. Alternatively, in a mobile device 100c such as in FIGS. 4 and 5, an application may be initiated (opened or viewed) from a touch screen display 28 by executing a "click" touch event or "clicking" the touch screen display 28 at the X and Y position of the corresponding icon 53.

Figure 9:
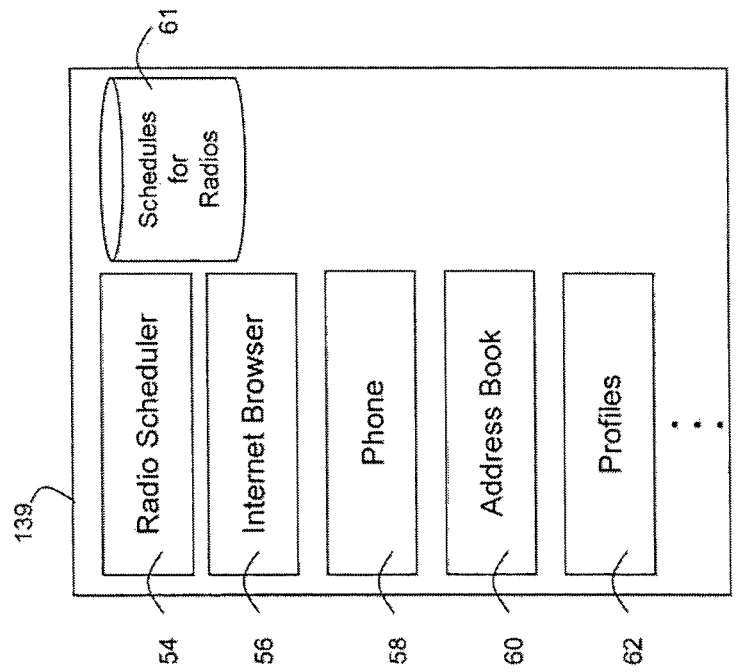
FIG. 9 is a block diagram illustrating exemplary ones of the other software applications and components shown in FIG. 6.

FIG. 9 shows an example of the other software applications and components 139 that may be stored on and used with the mobile device 100. Only examples are shown in FIG. 9 and such examples are not to be considered exhaustive. In this example, an internet browser 56, phone application 58, address book 60 and a profiles application 62 are shown to illustrate the various features that may be provided by the mobile device 100. It will be appreciated that the various applications may operate independently or may utilize features of other applications. For example, the phone application 58 may use the address book 60 for contact details.

Also shown in FIG. 9, stored on and used with mobile device 100 is a Radio Scheduler 54 software application for powering on and off one or more of the radios 151 a-n according to a schedule stored in a database 61. As will be explained in detail below, the Radio Scheduler 54 can operate in a "learn mode" and a "normal mode". During learn mode, the Radio Scheduler 54 powers on one or more radios 151a-n for a set designated period of time and during that time monitors and records the availability of wireless network coverage for each of the one or more radios 151a-n. Using the information collected during learn mode, independent schedules for each of the one or more radios 151a-n are then programmed by the Radio Scheduler 54 and stored in the database 61. Subsequently, when the Radio Scheduler 54 is operating in normal mode, it automatically powers on and off each radio 151a-n according to its particular schedule stored in the database 61.

The Radio Scheduler 54 can be configured to generate schedules and subsequently power on and off either all the radios 151 or just a particular subset of the radios 151.

An embodiment of the Radio Scheduler 54 will now be described with reference to FIGS. 10 to 12. In this embodiment, only the Wi-Fi radio is scheduled on and off by the Radio Scheduler 54. This embodiment is particularly useful because Wi-Fi "hotspots", that is, areas in which coverage is available for the Wi-Fi network, are often relatively localized and physically separated from one another by areas in which Wi-Fi network coverage is not available. Unlike many cellular wireless networks, a Wi-Fi network does not have broad coverage over a larger metropolitan area. Therefore, it can be advantageous to power off the Wi-Fi radio when Wi-Fi coverage is not available in order to save battery power.

Figure 10:
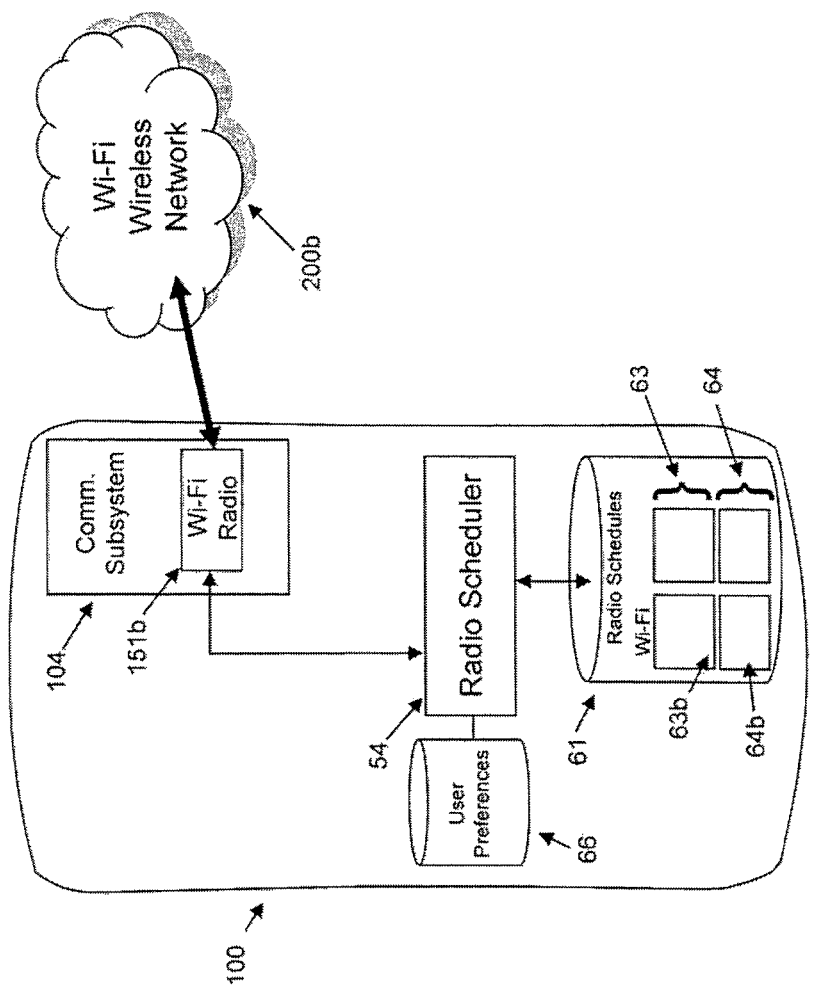
FIG. 10 is a schematic diagram of a mobile device illustrating one embodiment of a Radio Scheduler.

Turning therefore to FIG. 10, a mobile device 100 is shown having a Radio Scheduler software application 54. The Radio Scheduler 54 communicates with a database 61 to store and retrieve schedules 63 specifying the powering on and off of each of the radios 151a-n in the communication subsystem 104. In this particular embodiment, the Radio Scheduler 54 communicates with a Wi-Fi radio 151 b in the communication subsystem 104. The reference numeral '151b' has been used to indicate that the Wi-Fi radio 151b is only one of a number of radios 151a-n that form the communication subsystem 104. The Wi-Fi radio 151b communicates with a wireless router 26 (FIG. 1) over a Wi-Fi wireless network 200b using a Wi-Fi communication protocol.

When the Wi-Fi radio is powered on, the Digital Signal Processor (DSP) 160b (FIG. 7) of the Wi-Fi radio 151b periodically analyses signals (or the absence of signals) picked up by the receiver 150b to determine if Wi-Fi coverage is available. In regular operation, if Wi-Fi coverage is available, that is, if the mobile device 100 is in the range of a Wi-Fi network, for example, Wi-Fi network 200b, the radio 151 b will indicate to the main processor 102 that it is possible to communicate with the wireless router 26 over the Wi-Fi network 200b. As the mobile device 100 moves throughout physical space, it may or may not be within the coverage of a Wi-Fi network.

The Radio Scheduler 54 powers on and off the Wi-Fi radio 151b according to a schedule 63b stored in the database 61. The operation of the Radio Scheduler 54 and generation of the schedule 63b will now be explained with reference to FIG. 11.

The Radio Scheduler 54 can operate in learn mode, in which the schedule 63b is generated or modified, and the Radio Scheduler 54 can operate in normal mode, in which the Radio Scheduler 54 powers on and off the Wi-Fi radio 151b according to the schedule 63b. Turning therefore to FIG. 11, a set of computer readable instructions is shown that are used by the Radio Scheduler 54 during operation in learn mode. In step 302, the Radio Scheduler 54 is prompted to enter learn mode by the user of the mobile device. This can be done, for example, by the user moving a cursor 18 on the home screen 40 to select an icon 53 associated with Radio Scheduler 54. As an example, the user may choose to enter learn mode because he/she has just recently purchased the mobile device 100 and would like to establish a power on/off schedule for the Wi-Fi radio 151b. As another example, the user may choose to enter learn mode because the user's roaming habits have changed and he/she would therefore like to establish a new power on/off schedule for the Wi-Fi radio 151b.

Next, in step 304, the Radio Scheduler 54 then checks that the Wi-Fi radio 151b is powered on, and if not, the Radio Scheduler 54 powers on the Wi-Fi radio 151b. Then, in step 306, the Radio Scheduler 54 monitors and records in designated memory 64b information specifying the availability of Wi-Fi coverage. In this embodiment, the Radio Scheduler 54 records the time periods during which the Wi-Fi radio 151b indicates that the mobile device 100 is within or not within the coverage range of a Wi-Fi network, such as the Wi-Fi network 200b. This recording typically occurs for a specific designated period of time, such as for at least two days, or perhaps as long as a week or two. Conveniently, a small icon or series of characters (not shown) on display 12 can indicate to the user that the Radio Scheduler 54 is in learn mode, so that the user is aware and reminded when using the mobile device 100.

Figure 12:
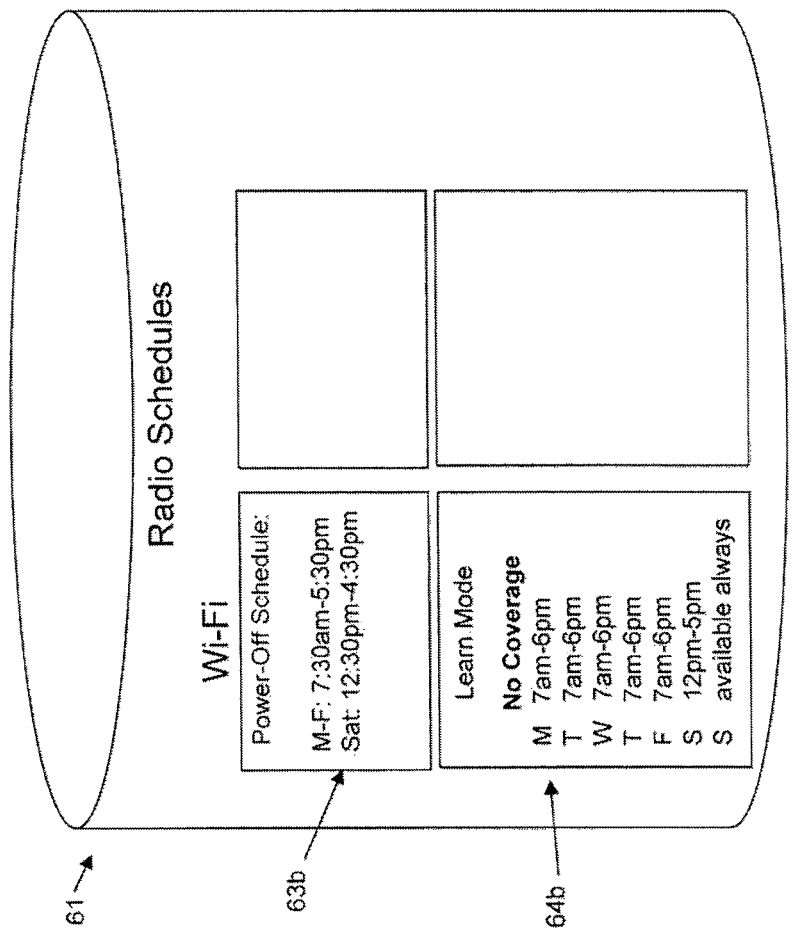
FIG. 12 is a block diagram illustrating one example of a schedule stored in a database.

FIG. 12 shows one example in which the Radio Scheduler 54 has operated in learn mode for one week and during that time has recorded in designated memory 64b when network coverage is not available for the Wi-Fi radio 151b. In this particular example, it can be seen that wireless network coverage is not available for the Wi-Fi radio 151b on weekdays between 7 am and 6 pm, as well as on Saturday afternoon. This coverage pattern may suggest, for example, that the user has Wi-Fi coverage in their home, but not outside their home (e.g. not at work). This information collected during learn mode for the Wi-Fi radio 151b is stored in designated memory 64b.

Once the Radio Scheduler 54 has completed monitoring the availability of Wi-Fi coverage for the designated period of time, next in step 308, the Radio Scheduler 54 generates a schedule using the information collected and stored in designated memory 64b. In this embodiment, the Radio Scheduler 54 simply generates a schedule for powering on and off the Wi-Fi radio 151b according to the times recorded during learn mode specifying the availability of Wi-Fi coverage. However, in order to accommodate small daily fluctuations in the user's schedule that may cause the user to enter the Wi-Fi coverage area a little early or leave the Wi-Fi coverage area a little late, the Wi-Fi radio 151b is scheduled to be powered on for a half hour of extra buffer time at the beginning and end of each period during which Wi-Fi coverage has been recorded as being available. In general, by scheduling the Wi-Fi radio 151b to be powered off for only a subset of time during which network coverage is recorded as not being available, instead of the whole time network coverage is recorded as not being available, the Wi-Fi radio 151b will remain powered on for a long enough duration to accommodate small daily fluctuations in the user's schedule.

The generated schedule is then stored in memory 63b in the database 61. Referring to the example in FIG. 12, it can be seen that schedule 63b is generated according to the above-described embodiment. Specifically, the Wi-Fi radio 151b is scheduled to be powered off on weekdays between 7:30 am and 5:30 pm and on Saturday between 12:30 pm and 4:30 pm.

Subsequently, in step 310, the Radio Scheduler 54 automatically exits learn mode and defaults to normal mode. In normal mode, the Radio Scheduler 54 powers on and off the Wi-Fi radio 151b according to the schedule 63b generated in learn mode.

It will be appreciated that the specific embodiment shown in FIG. 12 is just one particular example. Notably, in other embodiments, the Radio Scheduler 54 may be programmed to operate in learn mode for only a few days and generate a schedule that repeats on a daily basis. In such embodiments, it will be appreciated that a variety of processes may be used to generate the schedule. For example, in one such embodiment, a schedule that repeats on a daily basis is generated that powers on the Wi-Fi radio 151b during all periods of the day during which wireless coverage was found to be available during learn mode. For example, if the device operates in learn mode for three days, and on the first day coverage for the Wi-Fi radio 151b is available between 5 pm and 7 am, on the second day coverage is available between 4 pm and 7 am, and on the third day coverage is available between 5 pm and 7:30 am, then the schedule generated will ensure the Wi-Fi radio 151b is powered on between 4 pm and 7:30 am, and may possibly add an additional buffer time (e.g. one half hour on each end as described above).

It is also contemplated that in alternative embodiments, the user is able to temporarily disable the operation of Radio Scheduler 54 and therefore cause the Wi-Fi radio 151b to be always powered on. This functionality is useful when the user is travelling or otherwise deviating from his/her usual roaming habits and therefore wants the Wi-Fi radio 151b to be always powered on. Additionally, it is also contemplated that in alternative embodiments the Radio Scheduler 54 can be configured to automatically disable on certain days (e.g. weekends) when the user's roaming habits are generally more sporadic, thereby causing the Wi-Fi radio 151b to be always powered on these days. In order to provide this functionality, it is contemplated that in one embodiment a simple user interface (not shown) accessible through home screen 40 allows the user to temporarily disable Radio Scheduler 54, or program a schedule specifying the days or periodicity with which the Radio Scheduler 54 is to be disabled, or both. Such preferences can be stored in a user preferences database 66 accessible by the Radio Scheduler 54.

Therefore, to summarize the embodiment described above, in use the user prompts the Radio Scheduler 54 to enter learn mode, preferably through a menu accessible on the home screen 40. The Radio Scheduler 54 then monitors the availability of network coverage for the Wi-Fi radio 151b over a designated period of time. This designated period of time may be a default length of time (e.g. 1 week) stored in the Radio Scheduler 54. It may also be modifiable by the user. The Radio Scheduler 54 then generates a power on/off schedule for the Wi-Fi radio 151b based on the information collected. The Radio Scheduler 54 then exits learn mode and enters normal mode. During normal mode, the Radio Scheduler 54 powers on and off the Wi-Fi radio 151b according to the schedule stored in the database 61. In some embodiments the user may disable the Radio Scheduler 54 when the user wishes to have the Wi-Fi radio 151b always powered on, for example, if the user is travelling and therefore deviating from his/her usual roaming habits. Also, it is contemplated that in some embodiments the user may program Radio Scheduler 40 to periodically disable on certain days (e.g. on weekends) when the user's roaming habits are more sporadic.

Figure 11:
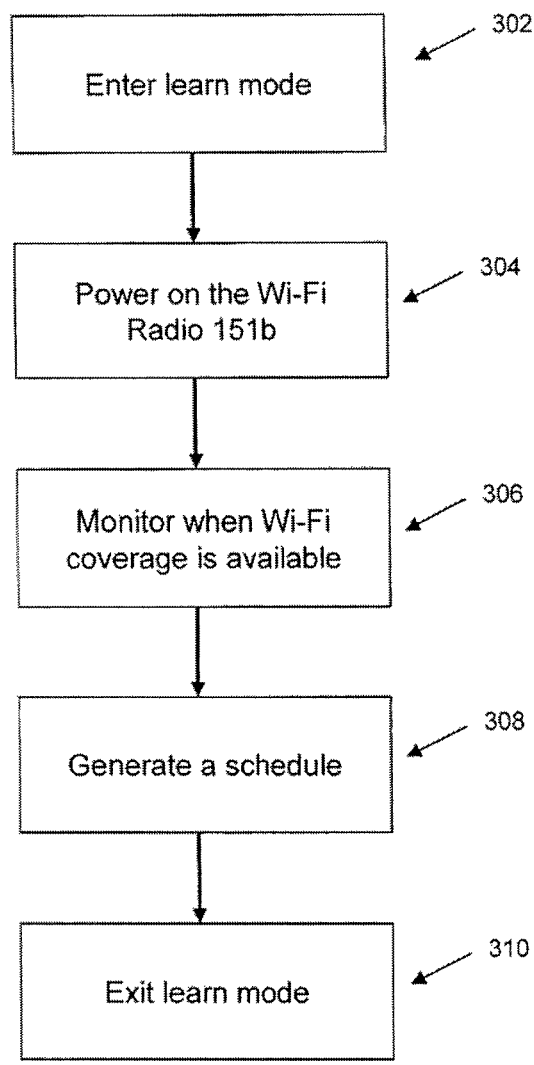
FIG. 11 is schematic diagram of a set of computer executable instructions for generating a schedule for a radio.

In the embodiment described in FIGS. 10 and 11, the Radio Scheduler 54 controls the powering on and off of only the Wi-Fi radio 151b. It will be appreciated that this is only one particular embodiment and that in general other radios 151 in the communication subsystem 104 may be powered on and off by the Radio Scheduler 54 instead of or in addition to the Wi-Fi radio 151b.

For example, coverage for Bluetooth networks are typically very localized and often physically separated from one another by large areas in which Bluetooth network coverage is not available. Therefore, an embodiment in which the Bluetooth radio is also scheduled on and off by the Radio Scheduler 54 can be particularly useful.

As mentioned above, the Radio Scheduler 54 can be configured to generate schedules and power on and off one, some, or all of the radios 151. An embodiment will now be described with reference to FIGS. 13 to 15 in which the Radio Scheduler 54 controls the powering on and off of all the available radios 151a-n. This embodiment is particularly useful because multiple radios may be powered off when there is no coverage available (according to their schedules) and therefore battery power is not unnecessarily wasted powering radios for networks in which no coverage is available.

Figure 13:
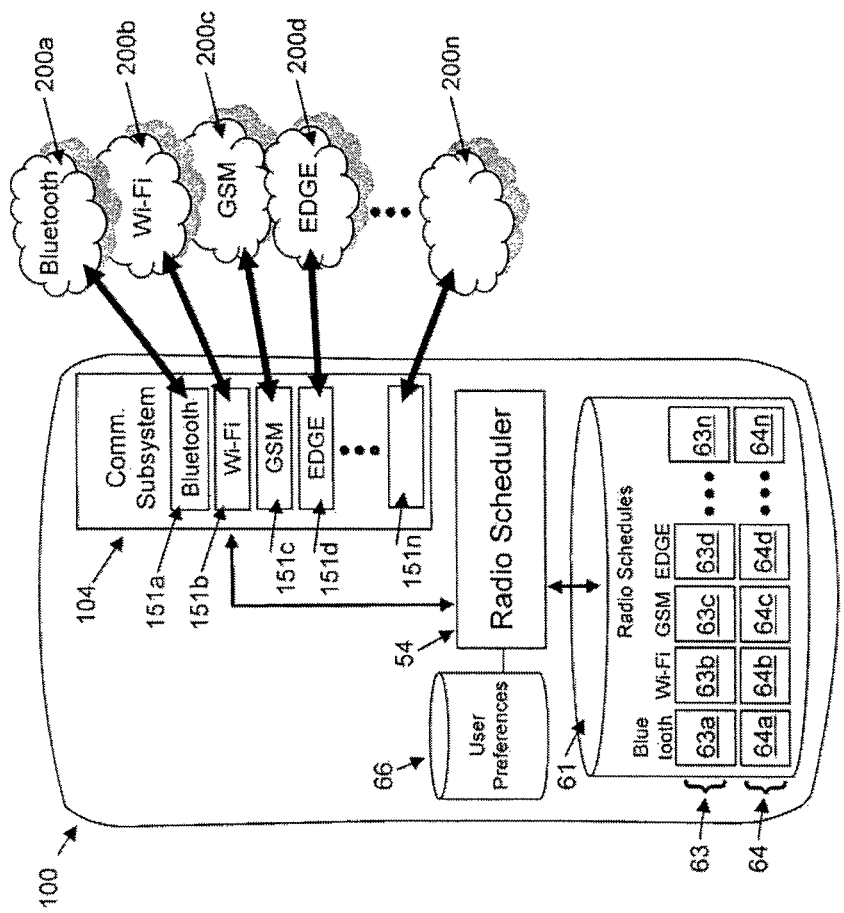
FIG. 13 is a schematic diagram of a mobile device illustrating another embodiment of the Radio Scheduler.

Turning therefore to FIG. 13, a mobile device 100 is shown having a Radio Scheduler software application 54. The Radio Scheduler 54 communicates with a database 61 to store and retrieve schedules 63 specifying the powering on and off of each of the radios 151a-n in the communication subsystem 104.

When each radio 151a-n is powered on, the Digital Signal Processor (DSP) of each radio 151a-n periodically analyses signals (or the absence of signals) picked up by its receiver to determine if coverage is available. In regular operation, if coverage is available for a particular network, the associated radio will indicate to the main processor 102 that it is possible to communicate over that network. As the mobile device 100 moves throughout physical space, it may or may not be within the coverage of a particular network.

The Radio Scheduler 54 operates to power on and off each of the radios 151a-n according to each corresponding schedule 63a-n stored in the database 61. The operation of the Radio Scheduler 54 and generation of the schedules 63 will now be explained with reference to FIG. 14.

Figure 14:
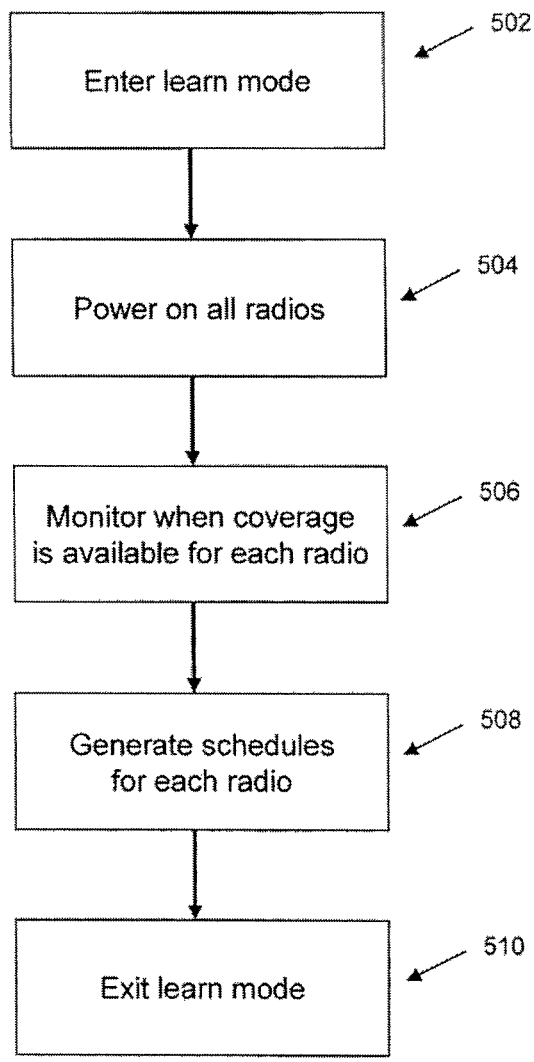
FIG. 14 is schematic of another set of computer executable instructions for generating a schedule for a radio.

The Radio Scheduler 54 can operate in learn mode, in which the schedules 63 are generated or modified, and the Radio Scheduler 54 can operate in normal mode, in which the Radio Scheduler 54 powers on and off each radio 151a-n according to its corresponding schedule 63a-n. Turning therefore to FIG. 14, a set of computer readable instructions is shown that are used by the Radio Scheduler 54 during operation in learn mode. In step 502, the Radio Scheduler 54 is prompted to enter learn mode by the user of the mobile device. Next, in step 504, the Radio Scheduler 54 powers on each radio 151a-n. Then, in step 506, the Radio Scheduler 54 monitors and records in designated memory 64b information specifying the availability of network coverage for each radio 151a-n. In this embodiment, the Radio Scheduler 54 independently monitors and records the time periods during which each radio 151a-n indicates it is within or not within the coverage range of its network. This recording typically occurs for a specific designated period of time, such as for at least two days, or perhaps as long as a week or two.

Figure 15:
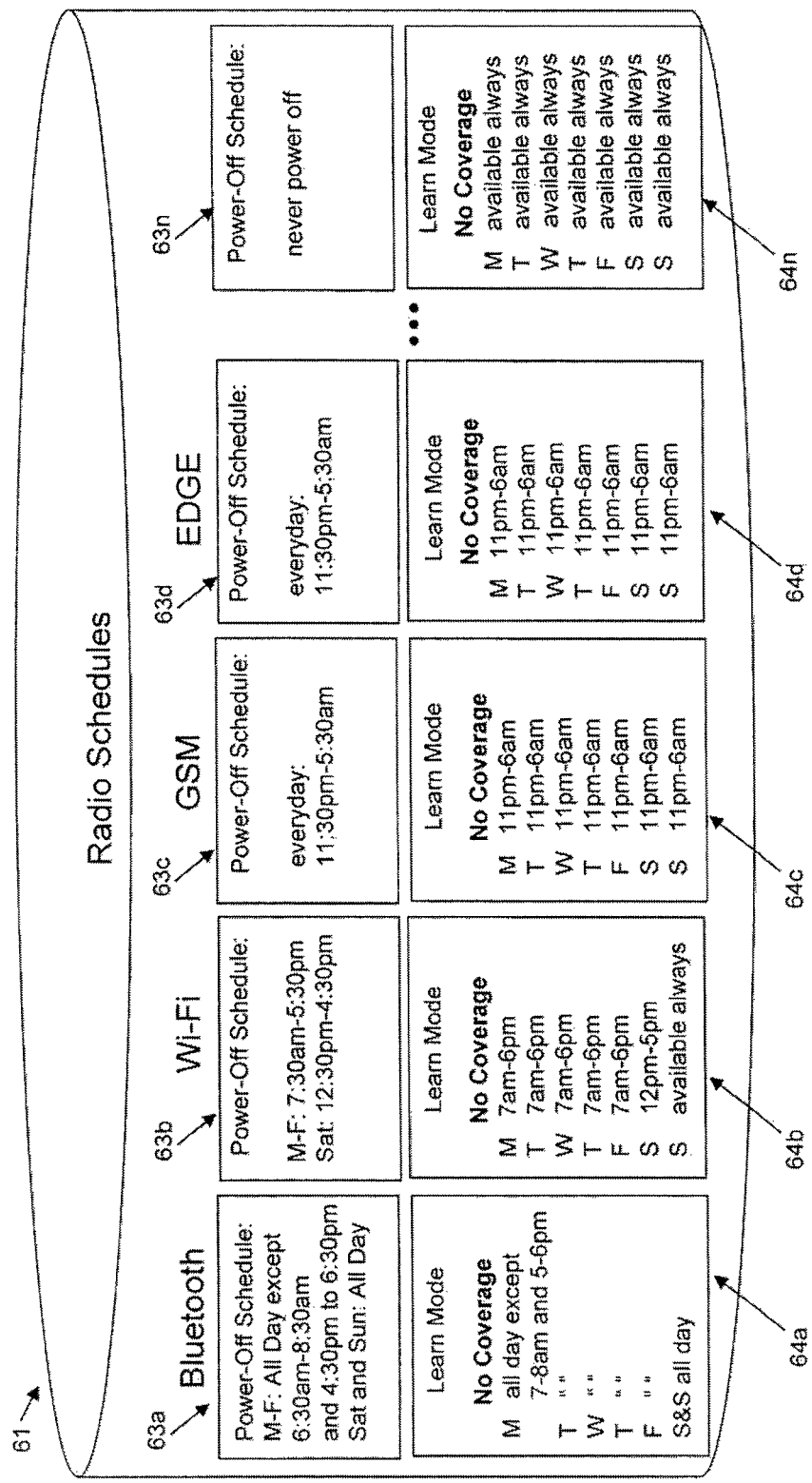
FIG. 15 is a block diagram illustrating another example of a set of schedules stored in a database.

FIG. 15 shows one example in which the Radio Scheduler 54 has operated in learn mode for one week and during that time has recorded in designated memory 64a-n when network coverage is not available for each radio 151a-n. In this particular example, it can be seen that wireless network coverage is only available to the Bluetooth radio 151a between 7 am and 8 am and between 5 pm and 6 pm on weekdays. This may suggest, for example, that the user has a hands-free Bluetooth connection in their vehicle which is used when driving to and from work. Similarly, it can be seen from FIG. 15 that network coverage is not available for the Wi-Fi radio 151b on weekdays between 7 am and 6 pm, as well as on Saturday afternoon. This coverage pattern may suggest, for example, that the user has Wi-Fi coverage in their home, but not outside their home (e.g. at their work). Moreover, it can be seen from FIG. 15 that the user always has network coverage for the GSM and EDGE cellular radios 151c and 151d, except between 11 pm and 6 am. This may suggest, for example, that the user sleeps in an area of the house where GSM and EDGE cellular coverage is not available.

The information collected during lean mode for each radio 151a-n is stored in respective designated memory 64a-n.

Once the Radio Scheduler 54 has completed monitoring when coverage is available for the radios 151, next in step 508, the Radio Scheduler 54 generates a schedule for each radio 151a-n using the information stored in respective designated memory 64a-n. In this embodiment, the Radio Scheduler 54 simply generates a schedule for powering on and off each radio 151a-n according to the times recorded during learn mode specifying the availability of network coverage for each radio 151a-n. However, in order to accommodate small daily fluctuations in the user's schedule that may cause the user to enter a coverage area for a particular radio a little early or leave the coverage area a little late, each radio 151a-n is scheduled to be powered on for a half hour of extra buffer time at the beginning and end of each period during which coverage has been recorded as being available. In general, by scheduling each radio 151a-n to be powered off for only a subset of time during which network coverage is recorded as not being available, instead of the whole time network coverage is recorded as not being available, the each radio 151a-n will remain powered on for a long enough duration to accommodate small daily fluctuations in the user's schedule.

The schedule for each radio 151a-n is then stored in respective memory 63a-n in the database 61. Referring to the example in FIG. 15, it can be seen that schedules 63a-n are generated according to the above-described embodiment.

Subsequently, in step 510, the Radio Scheduler 54 automatically exits learn mode and defaults to normal mode. In normal mode, the Radio Scheduler 54 powers on and off each of the radios 151a-n according to the respective schedules 63a-n generated during learn mode.

It will be appreciated that the specific embodiment shown in FIG. 15 is just one particular example. For example, as discussed earlier, it is contemplated that in other embodiments, the Radio Scheduler 54 may be programmed to operate in learn mode for only a few days and generate a schedule for each radio 151a-n that repeats on a daily basis.

Additionally, as described earlier, it is contemplated that in some embodiments the user is able to temporarily disable the operation of the Radio Scheduler 54 and therefore cause all radios 151a-n to be always powered on. This functionality is useful when the user is travelling or otherwise deviating from his/her usual roaming habits and therefore wants radios to be powered on that may usually be powered off. Additionally, it is also contemplated that the Radio Scheduler 54 can be programmed to automatically disable on certain days (e.g. weekends) when the user's roaming habits are generally more sporadic, thereby causing all radios 151a-n to be always powered on these days. Such user preferences can be stored in a database 66 accessible by the Radio Scheduler 54.

Although the invention has been described with reference to certain specific embodiments, various modifications thereof will be apparent to those skilled in the art without departing from the spirit and scope of the invention as identified in the claims appended hereto.

The invention claimed is:

1. A method of automatically powering on and off one or more radios in a mobile device, the method comprising:

storing a schedule in memory for each of the one or more radios based recorded information in memory specifying previously learned availability of network coverage for each of the one or more radios, the schedule indicating at least one of a detected availability and a detected unavailability of network coverage for each of the one or more radios;

retrieving from memory the schedule for each of the one or more radios; and powering on and off each of the one or more radios according to the schedule.

2. The method of claim 1, the schedule: (i) recording time periods during which network coverage is available for each of the one or more radios; or (ii) recording time periods during which network coverage is not available for each of the one or more radios.

3. The method of claim 2, the schedule specifying that each of the one or more radios be powered off for a subset of time in which network coverage is not available.

4. The method of claim 1, wherein the powering on and off is periodically disabled and all of the one or more radios is powered on.

5. The method of claim 4, the periodically disabling occurring according to preferences programmed in the mobile device.

6. The method of claim 1, the one or more radios comprising any one or more of: a Wi-Fi radio, a Bluetooth radio, and a Wi-Max radio.

7. A non-transitory computer readable medium having stored thereon computer readable instructions for automatically powering on and off one or more radios in a mobile device, the computer readable instructions comprising instructions for:

storing a schedule in memory for each of the one or more radios based recorded information in memory specifying previously learned availability of network coverage for each of the one or more radios, the schedule indicating at least one of a detected availability and a detected unavailability of network coverage for each of the one or more radios;

retrieving from memory the schedule for each of the one or more radios; and powering on and off each of the one or more radios according to the schedule.

8. A mobile device comprising a radio scheduling software application for automatically powering on and off one or more radios in the mobile device, the mobile device further comprising memory, and the radio scheduling software application configured for:

storing a schedule in memory for each of the one or more radios based recorded information in memory specifying previously learned availability of network coverage for each of the one or more radios, the schedule indicating at least one of a detected availability and a detected unavailability of network coverage for each of the one or more radios;

retrieving from memory the schedule for each of the one or more radios; and powering on and off each of the one or more radios according to the schedule.

9. The mobile device of claim 8, the schedule: (i) recording time periods during which network coverage is available for each of the one or more radios; or (ii) recording time periods during which network coverage is not available for each of the one or more radios.

10. The mobile device of claim 9, the schedule specifying that each of the one or more radios be powered off for a subset of time in which network coverage is not available.

11. The mobile device of claim 8, wherein the powering on and off is periodically disabled and all of the one or more radios is powered on.

12. The mobile device of claim 11, the periodically disabling occurring according to preferences programmed in the mobile device.

13. The mobile device of claim 8, the one or more radios comprising any one or more of: a Wi-Fi radio, a Bluetooth radio, and a Wi-Max radio.

14. A method of automatically powering on and off one or more radios in a mobile device, the method comprising:

powering on the one or more radios for a designated period of time;

during the designated period of time, recording in memory information specifying availability of network coverage for each of the one or more radios; and generating a schedule for each of the one or more radios using the information.

15. The method of claim 14 further comprising prompting initiation of the method prior to the powering on the one or more radios.

16. The method of claim 14, the one or more radios comprising any one or more of: a Wi-Fi radio, a Bluetooth radio, and a Wi-Max radio.

17. The method of claim 14 wherein the designated period of time comprises at least two days.

18. The method of clam 17 wherein during the designated period of time, a display on the mobile device indicates that the mobile device is collecting information specifying availability of network coverage for each of the one or more radios.

19. A non-transitory computer readable medium having stored thereon computer readable instructions for automatically powering on and off one or more radios in a mobile device, the computer readable instructions comprising instructions for:

powering on the one or more radios for a designated period of time; during the designated period of time, recording in memory information specifying availability of network coverage for each of the one or more radios; and generating a schedule for each of the one or more radios using the information.

20. A mobile device comprising a radio scheduling software application for automatically powering on and off one or more radios in the mobile device, the mobile device further comprising memory, and the radio scheduling software application configured for:

powering on the one or more radios for a designated period of time;

during the designated period of time, recording in memory information specifying availability of network coverage for each of the one or more radios; and generating a schedule for each of the one or more radios using the information.

21. The mobile device of claim 20, the radio scheduling software application further configured for prompting initiation of the method prior to the powering on the one or more radios.

22. The mobile device of claim 20, the one or more radios comprising any one or more of: a Wi-Fi radio, a Bluetooth radio, and a Wi-Max radio.

23. The mobile device of claim 20, wherein the designated period of time comprises at least two days.

24. The mobile device of clam 23 wherein during the designated period of time, a display on the mobile device indicates that the mobile device is collecting information specifying availability of network coverage for each of the one or more radios.

25. A method of automatically powering on and off one or more radios in a mobile device, the method comprising:

operating the mobile device in a learning mode to determine availability of network coverage for each of the one or more radios during at least one designated period of time; and selectively powering on and off each of the one or more radios according to information determined during the learning mode.

26. The method of claim 25, further comprising recording the information determined during the learning mode in a schedule.

27. The method of claim 25, the learning mode being initiated after detecting that the mobile device is roaming.

28. The method of claim 25, the one or more radios comprising any one or more of: a Wi-Fi radio, a Bluetooth radio, and a Wi-Max radio.

29. The method of claim 25, further comprising prompting initiation of the method prior to the powering on the one or more radios.

30. The method of claim 25 wherein the designated period of time comprises at least two days.

31. The method of claim 30 wherein during the designated period of time, a display on the mobile device indicates that the mobile device is collecting information specifying availability of network coverage for each of the one or more radios.

32. A non-transitory computer readable medium having stored thereon computer readable instructions for automatically powering on and off one or more radios in a mobile device, the computer readable instructions comprising instructions for:

operating the mobile device in a learning mode to determine availability of network coverage for each of the one or more radios during at least one designated period of time; and selectively powering on and off each of the one or more radios according to information determined during the learning mode.

33. A mobile device comprising a radio scheduling software application for automatically powering on and off one or more radios in the mobile device, the mobile device further comprising memory, and the radio scheduling software application configured for:

operating the mobile device in a learning mode to determine availability of network coverage for each of the one or more radios during at least one designated period of time; and selectively powering on and off each of the one or more radios according to information determined during the learning mode.

34. The mobile device of claim 33, further comprising recording the information determined during the learning mode in a schedule.

35. The mobile device of claim 33, the learning mode being initiated after detecting that the mobile device is roaming.

36. The mobile device of claim 33, the one or more radios comprising any one or more of: a Wi-Fi radio, a Bluetooth radio, and a Wi-Max radio.

37. The mobile device of claim 33, further comprising prompting initiation of the method prior to the powering on the one or more radios.

38. The mobile device of claim 33, wherein the designated period of time comprises at least two days.

39. The mobile device of clam 38, wherein during the designated period of time, a display on the mobile device indicates that the mobile device is collecting information specifying availability of network coverage for each of the one or more radios.

* * * * *